US007024742B2

(12) United States Patent
Woyciesjes et al.

(10) Patent No.: US 7,024,742 B2
(45) Date of Patent: Apr. 11, 2006

(54) RIVET TOOL WITH REMOTE INTENSIFIER AUTO FILL/RECHARGE SYSTEM

(75) Inventors: James N. Woyciesjes, Milford, CT (US); David S. Calkins, Brandford, CT (US)

(73) Assignee: Newfrey LLC, Newark, DE (US)

( * ) Notice: Subject to any disclaimer, the term of this patent is extended or adjusted under 35 U.S.C. 154(b) by 217 days.

(21) Appl. No.: 10/690,976

(22) Filed: Oct. 22, 2003

(65) Prior Publication Data

US 2004/0148747 A1 Aug. 5, 2004

Related U.S. Application Data

(60) Provisional application No. 60/422,555, filed on Oct. 29, 2002.

(51) Int. Cl.
*B23P 19/00* (2006.01)

(52) U.S. Cl. .............................. 29/243.53; 29/243.54; 29/252; 29/243.521; 29/243.523; 29/524.1; 72/391.6

(58) Field of Classification Search .................. 29/509, 29/524.1, 525.05, 525.06, 798, 243.53, 243.54, 29/252, 243.521, 243.523, 243.524, 812.5, 29/709; 72/391.6
See application file for complete search history.

(56) References Cited

U.S. PATENT DOCUMENTS 3,367,166 A * 2/1968 Newton et al. ............ 29/812.5
3,457,763 A * 7/1969 Freeman ................ 29/243.523
3,541,792 A 11/1970 Ellis, Jr.
4,116,036 A 9/1978 Sheffield et al.
4,259,858 A * 4/1981 Freeman et al. ....... 29/243.523
4,903,522 A * 2/1990 Miller .................... 29/243.525
5,035,129 A * 7/1991 Denham et al. ............. 72/21.5
5,500,990 A * 3/1996 Wihan ................... 29/243.525
5,598,619 A * 2/1997 Rosier ................... 29/243.523
6,079,604 A * 6/2000 Banducci et al. ........... 227/112
6,125,680 A * 10/2000 Bradbury et al. .......... 72/391.6
6,240,613 B1 * 6/2001 O'Connor et al. ....... 29/407.01
6,256,854 B1 * 7/2001 Chitty et al. ............. 29/243.53
6,347,449 B1 * 2/2002 Calkins et al. ................ 29/701
6,502,008 B1 12/2002 Maurer et al.
6,543,115 B1 4/2003 Mauer et al.
6,568,062 B1 5/2003 Opper et al.
6,568,236 B1 5/2003 Kondo et al.
6,588,576 B1 7/2003 Roessler
6,622,363 B1 9/2003 Komsta

FOREIGN PATENT DOCUMENTS

EP 0995519 A2 * 4/2000
EP 0995520 A2 * 4/2000

* cited by examiner

*Primary Examiner*—Marc Jimenez
*Assistant Examiner*—Jermie E. Cozart
(74) *Attorney, Agent, or Firm*—Harness, Dickey & Pierce, P.L.C.

(57) ABSTRACT

A rivet setting tool having a remote intensifier and autofill/recharge system is provided. The rivet setting tool has a hydraulic pulling head which is coupled to an intensifier. The intensifier has a mechanism for providing hydraulic pressure to the hydraulic rivet head to set a rivet tool. The intensifier further has a mechanism for refilling/recharging the hydraulic system of the rivet setting head.

16 Claims, 4 Drawing Sheets

RIVET TOOL WITH REMOTE INTENSIFIER AUTO FILL/RECHARGE SYSTEM

CROSS-REFERENCE TO RELATED APPLICATIONS

This application claims the benefit of U.S. Provisional Application No. 60/422,555, filed on Oct. 29, 2002. The disclosure of the above application is incorporated herein by reference.

FIELD OF THE INVENTION

One field of the present invention relates generally to riveting machines and, more particularly, to a riveting system having a hydraulic remote intensifier with an auto-fill/recharge system and methods for operating the riveting system.

BACKGROUND OF THE INVENTION

The present invention relates to a blind rivet comprising a tubular rivet body in which is mounted a mandrel having a head portion at the narrow end of the stem so that when the mandrel is pulled back in the rivet, it upsets the rivet. When pulling-back of the mandrel is resisted with a predetermined force, the mandrel breaks off. A riveter that operates with such rivets typically has a housing formed at its front end with an aperture through which the rivet mandrel is engaged. Within the housing is a chuck that engages tightly around the mandrel and an actuating mechanism or pulling head which pulls the chuck backwardly, thereby upsetting the rivet and breaking off the mandrel.

In rivet setting machines, the operator sets a rivet held in the nose of the rivet tool by pulling a trigger. The remaining spend mandrel is drawn through the tool and through a collection tube into a collection box. A proximity switch senses the spent mandrel just before it enters the collection box.

There are a variety of different types of tools, both manual and powered, that are used to set pull-type blind fasteners. For industrial production, it is desirable to use a power tool that may have an air/hydraulic or electrical power assist to pull the mandrel stem. This facilitates the rivet setting operation.

It is known to automate the process of feeding rivets to the riveter tool, as for example shown in U.S. Pat. Nos. 6,240,613, 4,754,643, and 4,747,294, commonly assigned. It is also known to automate the mandrel collection process as taught, for example, in U.S. Pat. No. 4,972,985, also commonly assigned. The most common approach to automatic rivet feed and disposal uses hydraulically or pneumatically powered mechanisms for guiding blind rivets to the riveting tool and extracting broken off mandrels therefrom.

Common shortcomings of prior art apparatus for auto-feeding of rivets to the riveting tool is the potential of such systems to leak hydraulic fluid during maintenance, service and change-over. In addition, ways are constantly being sought which speed up the set-up capabilities as well as speeding up the rivet setting process.

SUMMARY OF THE INVENTION

It is an object of the present invention to overcome the deficiencies described above. As such, what is disclosed is a rivet setting tool having a hydraulically driven pulling head for engaging a mandrel of a rivet and upon actuation, resetting the rivet. The rivet setting tool has a hydraulic pressure source coupled to the riveting head and an intensifier operably coupled to the hydraulic pressure source. A hydraulic refill system is coupled to the hydraulic pressure source which is configured to apply pressure to the hydraulic pressure source to cause the charging of the hydraulic system upon maintenance or refilling of the rivet setting head of the hydraulic system.

In one embodiment of the present invention, a rivet setting tool is provided having a pulling head which has a hydraulic piston coupled to a rivet engaging jaw. A pneumatic intensifier defining a hydraulic pressure source is coupled to a hydraulic passage which is in turn coupled to the hydraulic piston. The hydraulic pressure source has a pneumatically actuated piston which is coupled to a rod which is slidably received within a ram housing. The ram housing is fluidly coupled to the hydraulic passage. The intensifier further has a baffle which divides an intensifier cavity into a hydraulic fluid source and a first cavity. The hydraulic fluid source is fluidly coupled to the ram housing when the rod is in a fill position and substantially fluidly sealed from the ram housing when the rod is in an actuation position within the ram housing. Application of air pressure to a first side of the piston causes hydraulic pressure to be applied to the hydraulic piston. Application of air pressure to a second side of the piston allows the rod to move from the actuation position to a filled position.

In another embodiment of the invention, a rivet setting tool having a pulling head including a hydraulic piston is provided. An intensifier having a hydraulic pressure source is coupled to the hydraulic piston. The intensifier has a refilling mechanism which when actuated fluidly couples a source of hydraulic fluid to the hydraulic piston. The intensifier further has a means for applying hydraulic pressure to the hydraulic passage to actuate a rivet setting mechanism.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
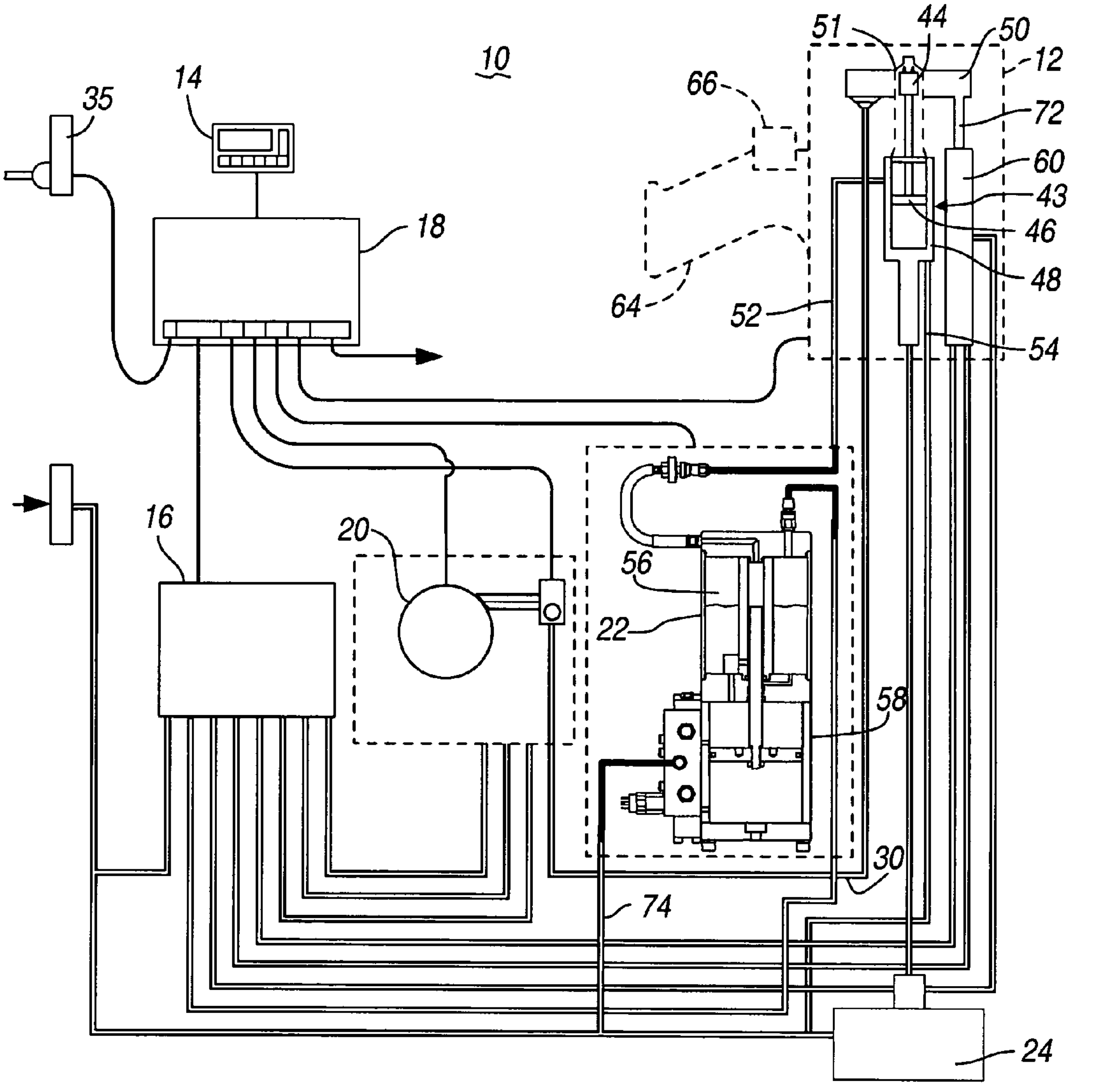
FIG. 1 represents a system overview of the rivet setting system according to the teachings of the present invention.

With reference to FIG. 1, the fastening system 10 according to the present invention is shown. Shown is a rivet setting tool 12 operably coupled to an electronic controller 14, hydraulic controller 16, a pneumatic controller 18, a rivet feeder 20, a remote hydraulic intensifier 22, and a mandrel collection system 24.

The rivet setting tool 12 includes a pulling head 44 which includes a hydraulic piston 46 within a machined aluminum housing 48. The hydraulic piston 46 is connected to jaw case 50 via a coupling so that during activation, i.e., hydraulic pressure supplied by a hydraulic hose 52 on the face of the hydraulic piston 46, the jaws 51 ramp off a nose piece, and engage the rivet mandrel. Continued travel provides enough force and stroke to effectively set the average rivet. The pulling head 44 employs air pressure via pneumatic tube 54 on the opposite side of the hydraulic piston 46 to return the hydraulic piston 46 to its full forward position once hydraulic pressure is removed.

Figure 2:
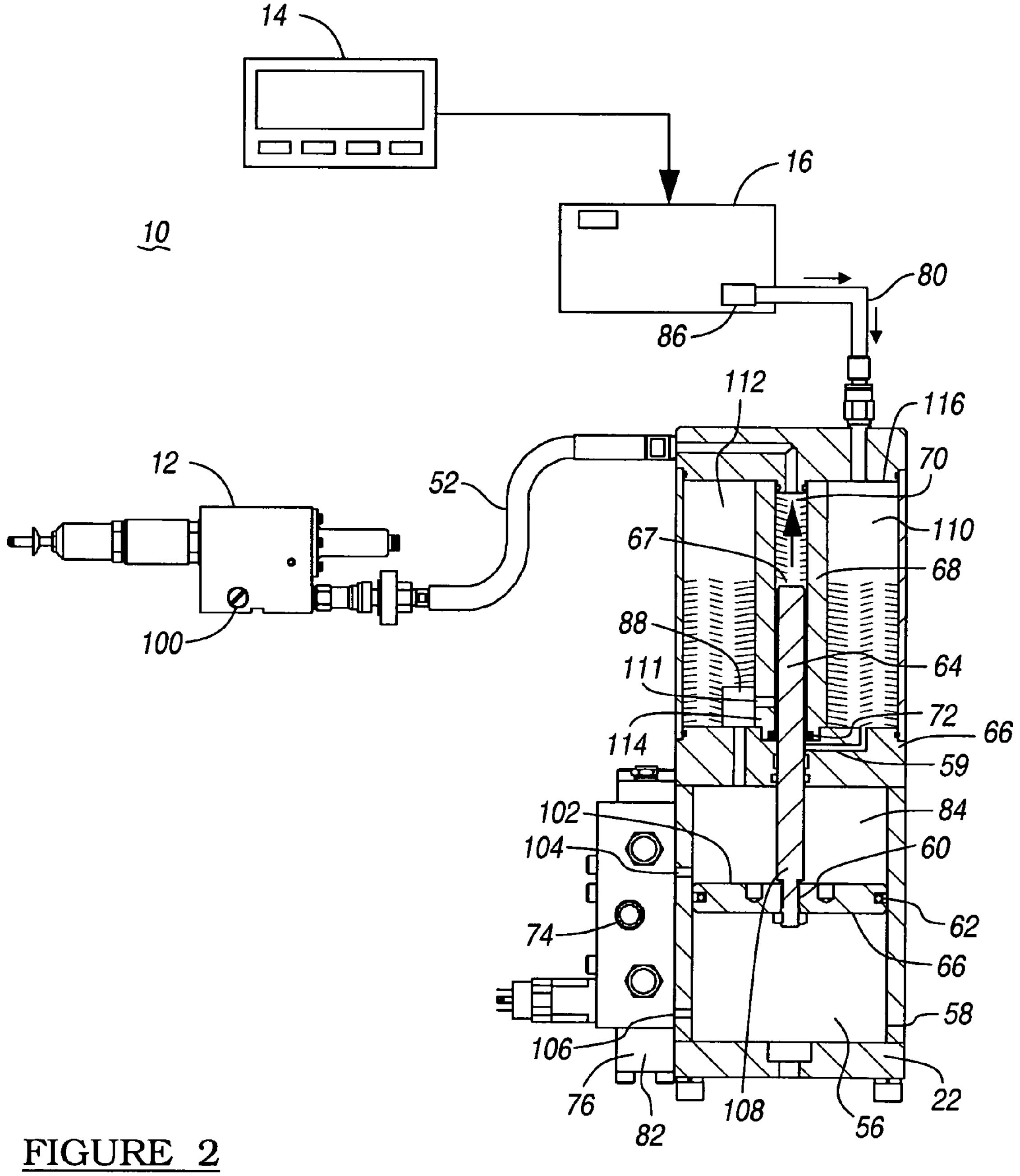
FIG. 2 represents a subassembly of the rivet setting system in its actuation position.

The hydraulic supply hose 52 is connected to the remote intensifier 22. As shown in FIG. 2, the remote intensifier 22 includes an intensifier chamber 56 which is defined within an intensifier chamber body 58. An air piston 60 is slidably received in the intensifier chamber 56 and is provided with a seal 62 which engages intensifier chamber body 58. A rod 64 is attached to air piston 60 and extends through a sealed cylindrical opening aperture defined through an intensifier chamber intermediate baffle 66 and into a cylindrical opening defined in a ram housing 68 which is filled with hydraulic oil 70. A seal 72 is further provided between the rod 64 and the ram housing 68 which substantially fluidly separates the intensifier chamber 56 from a bore 67 defined by the ram housing 68. A source of pressurized air in the form of pneumatic tube 74 is connected to a valve 76 which is connected to a first quick dump exhaust valve 78 which communicates with a first end of intensifier chamber 56. A second supply of pressurized air in the form of a second pneumatic tube 80 is provided in communication with a second end 84 of intensifier chamber 56. A second quick dump exhaust valve 82 is provided in communication through line 104 with the second portion 84 of intensifier chamber 56. The ram housing 68 is connected to the hydraulic hose 52 by a plurality of fittings.

Air pressure applied to the air piston 60 forces the rod 64 to displace a column of hydraulic oil 70 with a smaller cross-sectional area. The volume of air acting on the area of the piston forces the air piston 60 and rod 70 upward. The differential in area between the air piston 60 and the top of the rod 70 allows the generation of a high hydraulic pressure from a low air pressure. As the air piston 60 moves upward, first exhaust dump valve 78 opens to vent air building up on top of air piston 60. The high pressure column of oil 70 flows through the hydraulic hose 52, and forces the pulling head hydraulic piston 46 of pulling head 44 back, thus setting the rivet. During operation, should the fluid level become low, fluid flows through open hydraulic system port 59 to replenish the fluid supply within bore 67.

Upon mandrel break, the controller 16 stops activating the valve 76, and starts activating a remote valve (not shown) supplying a regulated supply of air through quick dump exhaust valve 82 and on top of air piston 60. The combination of the air behind the pulling head piston 46 of the pulling head 44 disposed within the rivet setting tool 12, and the air bubble on top of the air piston 66 quickly returns the pulling head 44 and jaw case 50 to the retracted position. The venting of the second portion 84 of the intensifier chamber 56 to atmosphere limits that possibility by limiting pressure build up. Air supply to the top of the air piston 60 is controlled by the riveting system controller 14 and shuts off after approximately one second.

Figure 3:
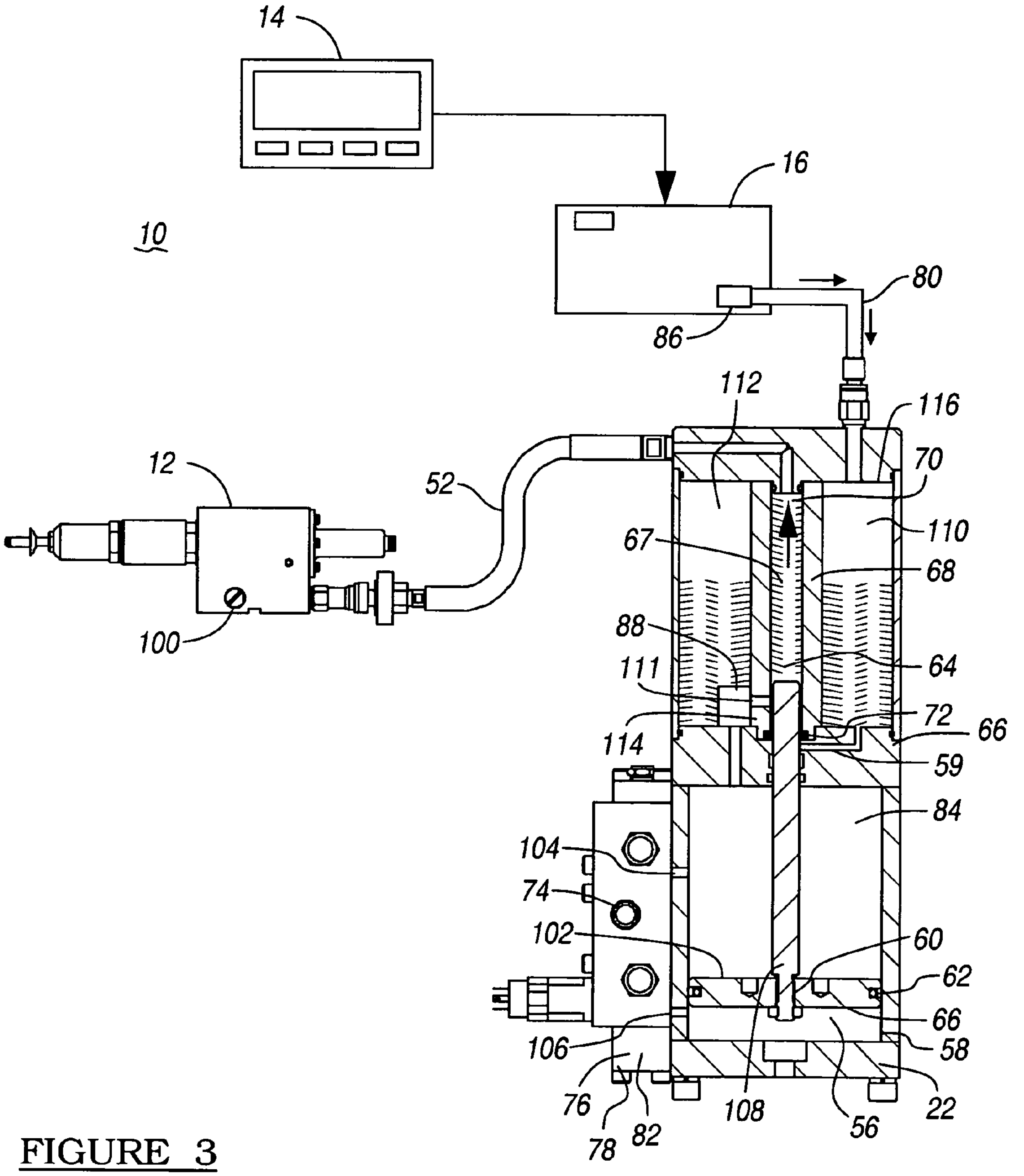
FIG. 3 represents a view of the rivet setting system shown in FIG. 1 in its fill position.

FIG. 3 represents the system 10 of the present invention in its automatic refill mode. Upon actuation of the refill feature by an operator, the electronic controller 14 functions to prompt the operator to open the bleed screw 100. After confirmation that a bleed screw 100 has been opened, the electronic controller 14 functions to send a signal to the pneumatic controller 18 to begin the refill process. Pneumatic pressure is now directly applied to a top surface 102 of the air piston 60 through pneumatic line 104. In this regard, air pressure is supplied by a pneumatic line 104 to a first cavity 106 formed between the air piston 60 and the baffle 66. Air pressure is applied so as to retract the rod 64 to a refill position 108, so as to allow the fluid coupling of a hydraulic source 110 with the ram housing 68.

As shown, a check valve 88 is fluidly positioned between the hydraulic fluid source 110 and the bore 67 of the ram housing 68. The check valve 88 is positioned at a proximal end 114 of the ram housing 68. Additionally, the ram housing can define a second aperture (not shown) to fluidly couple the hydraulic fluid source 110 to the ram housing 68. The second aperture can optionally have a check valve which allows the flow of hydraulic fluid from the fluid source 110 into the bore 67, while closing the fluidly coupling between the ram housing bore 67 to the hydraulic source when the rivets are being set. The rod 64 and intermediate baffle seal 72 fluidly separate the first cavity 106 from the hydraulic fluid source chamber 112.

Figure 4:
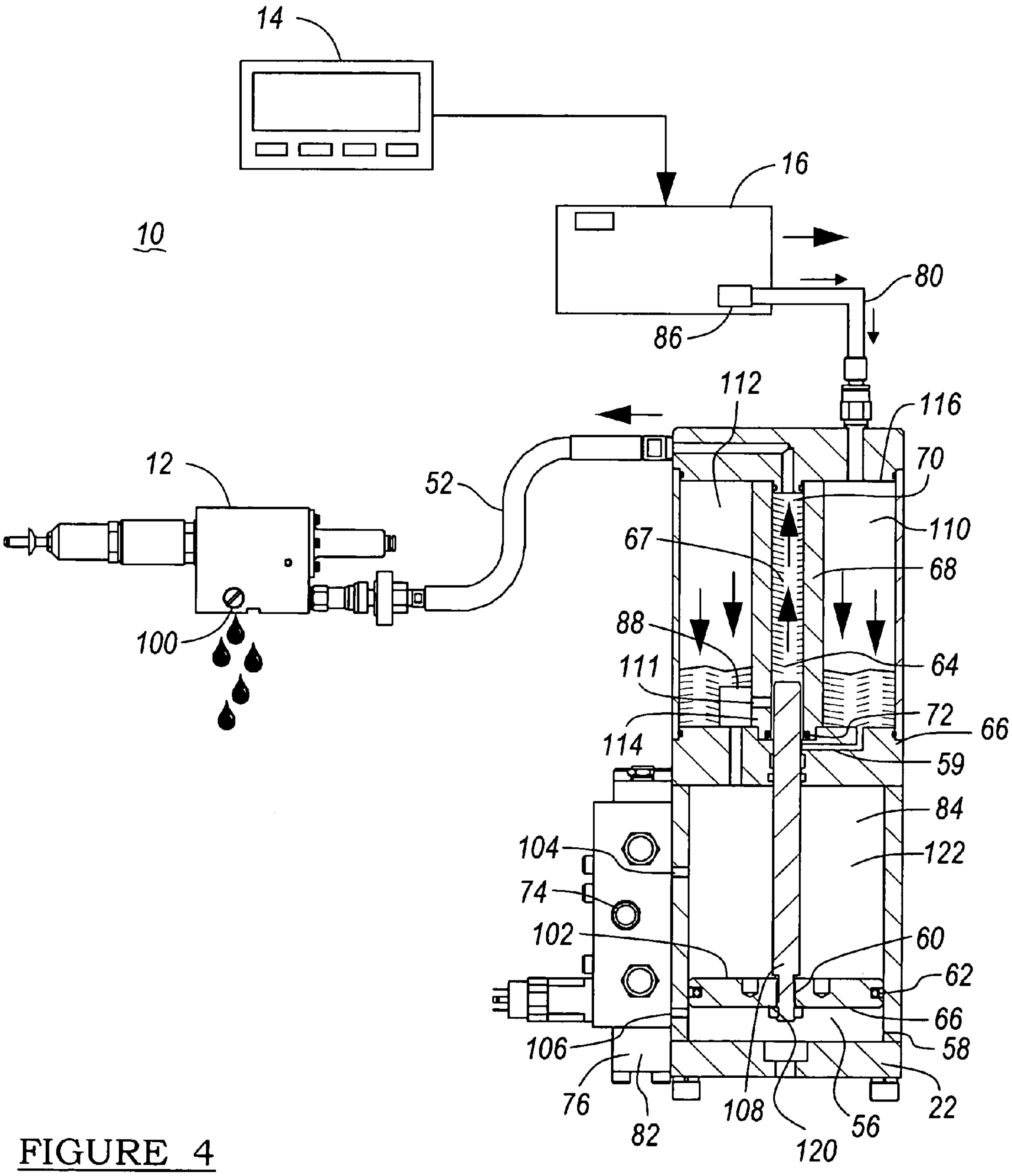
FIG. 4 represents the recharging or filling of the hydraulic system.

As seen in FIG. 4, once the bore 67 defined by the ram housing 68 is fluidly coupled to a source of hydraulic fluid 70, air pressure is supplied directly through pneumatic line 80 by the pneumatic controller 18 so as to supply hydraulic oil 70 through the ram housing 68 and into the hydraulically actuated rivet setting tool 12 to charge the hydraulic lines. Differential pressure opens check valve 88 to fluidly couple the hydraulic fluid source 110 with the bore 67. Specifically, pneumatic pressure is applied into the hydraulic fluid source chamber 112, between an upper surface of the hydraulic fluid 70 and the top surface 116 of the hydraulic source chamber 112. This pressure forces the hydraulic fluid through the check valve 88 located at the proximal end 114 of the ram housing 68 into the bore 67.

After sufficient hydraulic fluid 70 has escaped through the bleeder screw 100, the operator stops the recharging cycle by pressing a button on the electronic controller 14. The system 10 then applies pneumatic pressure to a bottom surface 120 of the air piston 60 through a pneumatic line 122 coupled to the bottom of the remote intensifier 22. This returns the air piston 60 to its actuation position 122, thus resetting the rod 64 into the ram housing 68 as shown in FIG. 2.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rivet setting tool, comprising:

a pulling head including a hydraulic piston disposed within a housing, said piston coupled to a jaw, the jaw operable to engage a rivet mandrel upon activation of the pulling head, whereby continued travel of the hydraulic piston supplies force to effectively set the rivet;

a hydraulic pressure source connected to said housing by a hydraulic passage;

a pneumatic intensifier operably coupled to the hydraulic pressure source;

a hydraulic refill system coupled to the hydraulic pressure source configured to apply pressure to the hydraulic pressure source to cause the charging of the hydraulic passage, wherein the hydraulic pressure source comprises a ram housing and the pneumatic intensifier defines an intensifier chamber, said pneumatic intensifier further comprising an air piston disposed within the intensifier chamber coupled to a rod such that movement of the air piston causes translation of the rod within the ram housing and thereby applying hydraulic pressure to the hydraulic passage, and wherein the intensifier further comprises a baffle, said baffle dividing the intensifier chamber into a hydraulic fluid supply and a first chamber.

2. The rivet setting tool of claim 1 wherein the piston is disposed within the first chamber.

3. The rivet setting tool of claim 2 wherein the rod is slidably received within an aperture defined by the baffle.

4. The rivet setting tool according to claim 1 wherein the ram housing is disposed within the hydraulic fluid supply.

5. The rivet setting tool according to claim 1 wherein the piston is configured to be movable from an actuation position to a refill position, wherein the rod is configured to be displaced so as to fluidly couple the ram housing to a fluid source when the piston is in the refill position.

6. The rivet setting tool according to claim 5 further wherein the hydraulic refill system comprises an air supply configured to apply pressure to the fluid source so as to cause the recharging of the hydraulic passage with hydraulic fluid.

7. The rivet setting tool according to claim 5 wherein the fluid source is the hydraulic fluid supply.

8. A rivet setting tool comprising a pulling head including a hydraulic piston disposed within a housing, said piston coupled to a jaw, the jaw operable to engage a rivet mandrel upon activation of the pulling head, whereby continued travel of the hydraulic piston supplies force to effectively set the head; and an intensifier operably coupled to the hydraulic piston through a hydraulic passage, the intensifier comprising a refill mechanism which when actuated fluidly couples a source of hydraulic fluid to the hydraulic passage and a means for applying hydraulic pressure to the hydraulic passage, wherein the means for applying hydraulic pressure to the hydraulic passage comprises a ram housing fluidly coupled to the hydraulic passage, and a rod slidably disposed within the ram housing, said rod configured to move in response to air pressure applied into the intensifier, wherein the intensifier defines an intensifier chamber, said intensifier chamber defining the source of hydraulic fluid, and wherein the intensifier further comprises a baffle which divides the intensifier chamber into the fluid source of hydraulic fluid and a first cavity.

9. The rivet setting tool according to claim 8 wherein the refill mechanism comprises a source of pneumatic pressure which is applied to the source of hydraulic fluid so as to cause hydraulic fluid to flow from the source of hydraulic fluid into the hydraulic passage.

10. The rivet setting tool according to claim 8 wherein the means for applying hydraulic pressure is at least partially disposed within the first cavity.

11. A rivet setting tool, comprising:

a pulling head including a hydraulic piston disposed within a housing, said piston coupled to a jaw, the jaw operable to engage a rivet mandrel upon activation of the pulling head, whereby continued travel of the hydraulic piston supplies force to effectively set the rivet; and a pneumatic intensifier defining an intensifier cavity having a hydraulic pressure source coupled to the hydraulic piston through a hydraulic passage, said hydraulic pressure source comprising a piston disposed within the intensifier cavity, the piston being coupled to a rod which is slidably received within a ram housing, said ram housing being fluidly coupled to the hydraulic passage, said intensifier further having a baffle which divides the intensifier cavity into a hydraulic fluid source and a first cavity, said hydraulic fluid source being fluidly coupled to the ram housing when the rod is in a fill position and substantially fluidly sealed from the ram housing when the rod is in an actuation position within the ram housing, wherein said piston is disposed within the first cavity and wherein the application of air pressure to a first side of the piston causes hydraulic pressure to be applied to the hydraulic piston, and wherein application of the air pressure to a second side of the piston allows the rod to move from the actuation position to the fill position.

12. The rivet setting tool according to claim 11 wherein the ram housing is disposed within the fluid source and wherein the ram housing comprises a check valve configured to fluidly couple the fluid source to the hydraulic passage when the rod is in the fill position.

13. The rivet setting tool according to claim 12 wherein the ram housing slidably receives the rod so as to allow hydraulic fluid to flow past the rod.

14. The rivet setting tool according to claim 11 further comprising a pneumatic controller operably coupled to the intensifier.

15. The rivet setting tool according to claim 14 further comprising an electronic controller coupled to the pneumatic controller.

16. The rivet setting tool according to claim 11 wherein the rod is movable from a filling position to an actuation position, said ram housing defines an interior cavity which is fluidly coupled to the hydraulic passage and the hydraulic fluid source when the rod is in the filling position.

* * * * *